Nov. 1, 1927.
C. STUART
1,647,482
SELF ADJUSTING CLUTCH OR BRAKE
Filed March 23, 1927     2 Sheets-Sheet 1
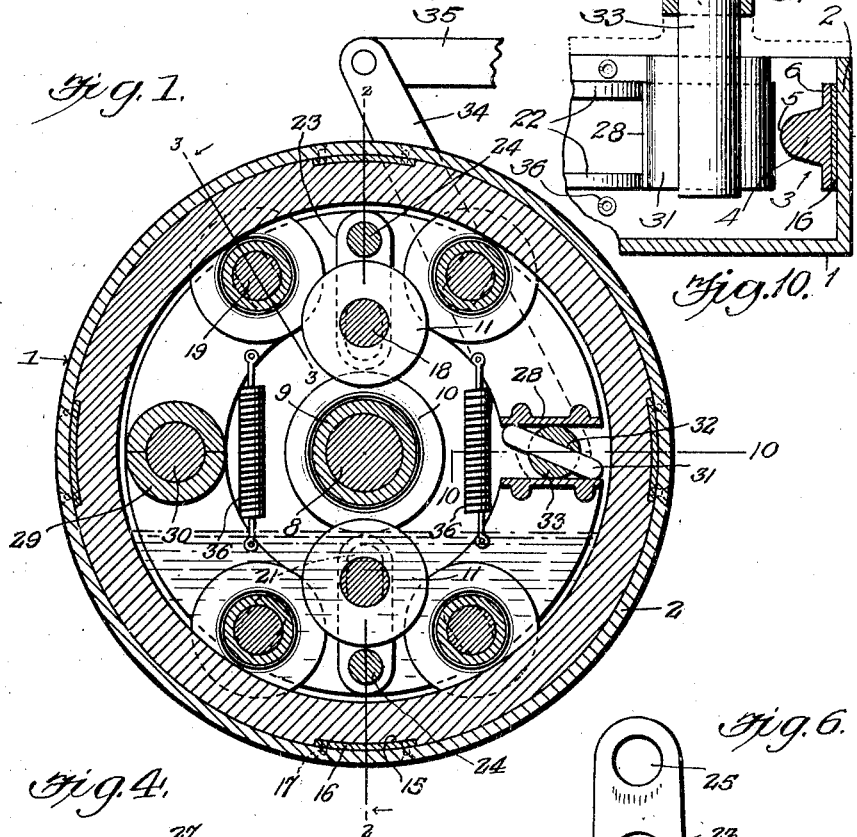
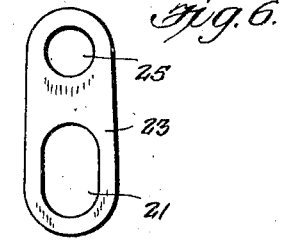
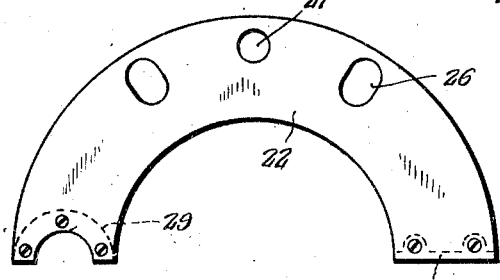
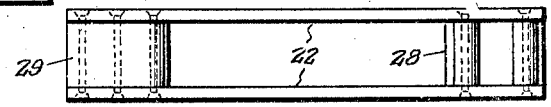
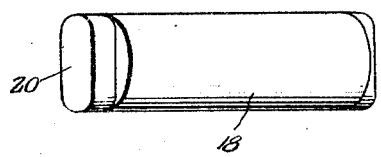
Inventor
Colin Stuart,
By
Attorney

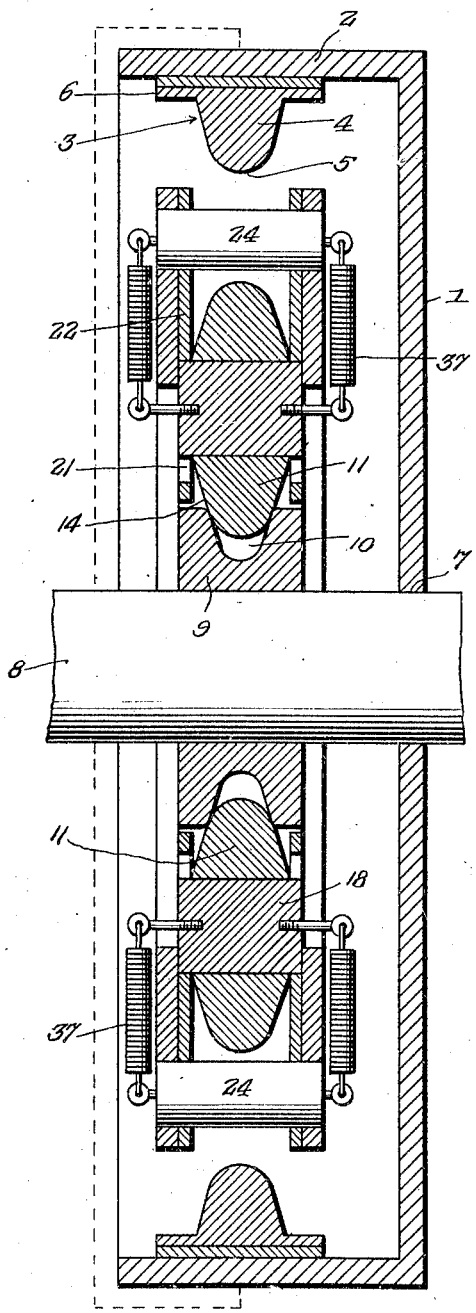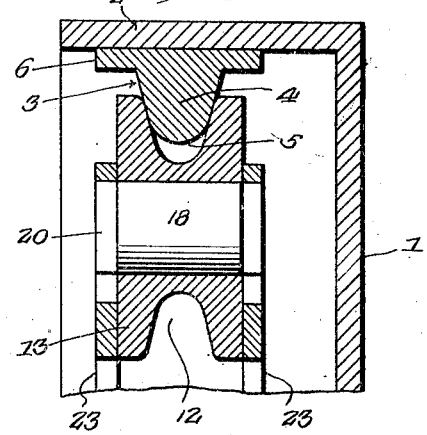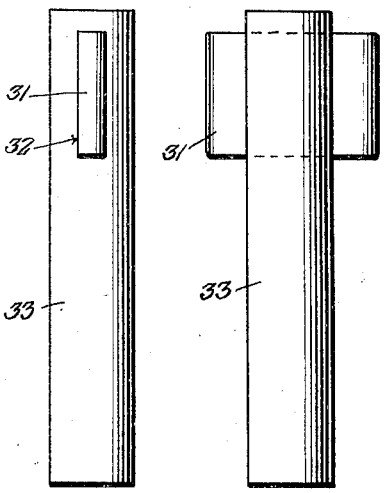

Patented Nov. 1, 1927.

1,647,482

UNITED STATES PATENT OFFICE.

COLIN STUART, OF JACKSON, MICHIGAN, ASSIGNOR OF ONE-HALF TO WILLIAM ILE, OF JACKSON, MICHIGAN.

SELF-ADJUSTING CLUTCH OR BRAKE.

Application filed March 23, 1927. Serial No. 177,666.

The invention relates to a self-adjusting clutch or brake.

The object of the present invention is to provide a simple, practical and efficient all-steel self-adjusting clutch or brake of the expanding and contracting type, of strong, durable and comparatively inexpensive construction designed for use on automobiles and adapted to be employed either as a brake or a clutch.

A further object of the invention is to provide a clutch or brake mechanism of this character adapted to be enclosed within a brake drum or analogous casing and equipped with rollers, having a rotative engagement and adapted to eliminate sliding contacts at the engaging portions.

Another object of the invention is to provide a brake or clutch equipped with brake shoes having automatically adjustable rollers adapted to equalize the pressure between a peripheral track and a central roller and adapted also to run in oil for lubricating purposes to reduce the wear to a minimum.

With these and other objects in view, the invention consists in the construction and novel combination and arrangement of parts hereinafter described, illustrated in the accompanying drawings, and pointed out in the claims hereto appended, it being understood that various changes in the form, proportion and minor details of construction, within the scope of the claims, may be resorted to without departing from the spirit of the invention or sacrificing any of the advantages.

In the drawings:

Figure 1 is a vertical sectional view of a self-adjusting clutch or brake mechanism constructed in accordance with this invention.

Fig. 2 is a vertical sectional view of the same taken substantially on the line 2—2 of Fig. 1.

Fig. 3 is a detail vertical sectional view taken on the line 3—3 of Fig. 1.

Fig. 4 is a detail view of one of the curved brake shoes.

Fig. 5 is a plan view of one of the brake shoes.

Fig. 6 is a detail view of one of the links for guiding the intermediate male pulley.

Fig. 7 is a detail view of one of the roller shafts.

Figs. 8 and 9 are detail views of the cam shaft.

Fig. 10 is a detail transverse sectional view taken substantially on the line 10—10 of Fig. 1.

In the accompanying drawings, in which is illustrated the preferred embodiment of the invention, the self-adjusting frictionless clutch or brake, which is designed to be constructed of hardened steel or other suitable material, comprises in its construction a brake drum 1 equipped at the inner face of its annular rim 2 with a circular track 3 consisting of a central transversely tapered rib 4 preferably rounded at the apex at 5 and provided at the base with laterally extending annular attaching flanges 6 which are secured to the rim of the brake drum. The brake drum, which may be of any desired construction, may be secured to the wheel of an automobile in any desired manner. In the accompanying drawing the brake drum is shown as consisting of a disk and an annular rim 2. The open side may be closed by a vehicle wheel or by any other suitable means, as will be readily understood. The brake drum is provided with a central opening 7 through which passes the axle shaft 8, and mounted on the latter within the drum is a female pulley roller 9. The female roller 9, which may be fixed to the axle shaft in any desired manner, is arranged concentric with the circular track 3, and it is provided with an annular peripheral groove 10 to receive an intermediate male roller 11 which also extends into similar peripheral grooves 12 of outer female rollers 13. The intermediate male roller 11 has a tapered peripheral portion 14 corresponding in cross sectional shape and size with the rib 4 of the circular track, and the said rib 4 also extends into the peripheral grooves of the outer female rollers, as clearly illustrated in Fig. 2 of the drawing. Two groups of the male and female rollers are preferably employed, as clearly illustrated in Fig. 1 of the drawings, a pair of male rollers 11 being located at diametrically opposite points on the periphery of the central female roller 9, and a pair of outer female rollers being engaged with the outer portion of each of the intermediate male rollers and being maintained in spaced relation by the same.

The circular track is provided at intervals at its outer periphery with recesses 15, and is interlocked with the rim of the drum by lugs 16 consisting of plates secured to the inner face of the rim of the drum by rivets 17 or other suitable fastening devices. The lugs interlock the circular track and the rim against relative circumferential movement, and any suitable means may be employed for holding the track against movement transversely of the drum as desired. The intermediate male roller and the outer female rollers are mounted on shafts 18 and 19 and these shafts have flattened end portions 20 forming flat faces at opposite sides of the end portions of the shaft, as clearly illustrated in Fig. 11 of the drawings. The flat end portions of the shaft 18 of the intermediate male roller are arranged in slots 21 of links 23 disposed radially of the drum and pivoted at their outer ends to curved brake shoe supports 22 by suitable pivots 24. The links are arranged in pairs and are provided at their outer ends with circular openings 25 to receive the pivot 24 and at their inner ends with the slots 21 to receive the flattened end portions of the shaft 18, as clearly illustrated in Fig. 8 of the drawings. The flattened end portions of the shafts 19 of the outer female rollers are arranged in slots 26 of the brake shoe supports 22, which constitute levers. The brake shoe supports are substantially semi-circular, as clearly illustrated in Fig. 4 of the drawings, and each is provided with a pair of slots 26 which diverge outwardly and converge inwardly, being disposed transversely of the curved brake shoe supports 22. The curved brake shoe supports 22 are provided between the angularly related converging slots 26 with circular openings 27 to receive the pivots 24, and the said circular openings 27 are located adjacent the outer edges of the brake shoe supports centrally of the same. The curved brake shoe supports are each composed of spaced side plates having a flat transverse connecting portion 28 at one end and a semicircular connecting bearing portion 29 at the other end, and any suitable number of spacing elements may be employed at intermediate points.

The curved brake shoe supports in which are slidably mounted the intermediate male rollers and the outer female rollers are fulcrumed at one end on a suitable pivot or shaft 30, which may be fixed to the brake drum in any desired manner. The intermediate male roller and the outer female rollers are adapted to rotate freely on the shafts 18 and 19, and the curved brake shoe supports are adapted to be expanded by a slidable cam 31 mounted in a slot or opening 32 in a shaft 33 having an arm 34 which is connected by a rod or bar 35 with suitable operating mechanism. The adjustable cam 31 consists of a plate loosely mounted in the opening 32 and projecting from the same at opposite sides of the shaft 33 and having its rounded terminal portions engaging the flat end portions 28 of the curved brake shoe supports 22. The outward movement of the brake shoes by means of the divergent angularly related walls of the adjacent slots produces a wedging action on the outer female rollers 13, forcing the same inwardly into tighter engagement with the intermediate male roller 11 and causing a corresponding engagement of the intermediate male roller 11 and the outer female roller 13 with the central female roller 9 and the circular track 3. This results in a braking action or clutching action, according to whether the mechanism is employed in a brake or clutch. The slidable cam 31 equalizes the pressure on the two brake shoes and the rollers automatically adjust themselves, maintaining a uniform pressure at the two groups of rollers at opposite sides of the central axle shaft 8. Suitable coiled springs 36 are connected with the brake shoe supports for drawing the same inwardly and relieving the pressure when the cam shaft 33 is released, and suitable coiled springs 37 may be connected with the shaft of the intermediate male roller 11 and with the pivot 24 of the links for relieving the pressure exerted by the male roller against the inner or central female roller 9. The springs 36 are located at opposite sides of the axle shaft and may be connected with the brake shoe supports in any desired manner, and the springs 37 of the intermediate male roller may be connected with the shafts thereof and the pivots of the links by any suitable means.

The rollers and the track are designed to run in oil for lubricating the parts, and the grooves of the female rollers which have rounded bottom walls, are of materially greater depth than the penetrating portion of the track and the male rollers, and there is a wedging action between the male and female rollers and also between the outer female rollers and the track, as clearly illustrated in Fig. 2 of the drawings, and the friction and wear incident to the sliding of engaging portions of a clutch or a brake are eliminated in the present invention, where the sliding action and wear are prevented by the rotative movement of the rollers on their shafts and around the circular track of the drum and the inner or central female roller 9.

What is claimed is:

1. A device of the class described including a circular track, a central roller, a pair of outer rollers arranged to run on the same track, an intermediate roller engaging the central roller and interposed between and engaging the outer rollers, and means for connecting the outer rollers and for increasing the pressure of the same against the track and the intermediate roller and for causing the latter to exert pressure against the central roller.

2. A device of the class described including a circular track having a transversely tapered engaging portion, a central female roller having a tapered peripheral groove, outer female rollers also provided with tapering peripheral grooves and arranged to run on the circular track in receiving the tapered portion thereof, an intermediate male roller having a tapered peripheral portion fitting in the peripheral grooves of said female rollers, and operating means for varying the pressure of the rollers against one another and the circular track.

3. A device of the class described including a circular track, a central roller, outer rollers arranged in pairs to run on the circular track, intermediate rollers interposed between the outer rollers and the central rollers, and levers connected with the intermediate and outer rollers for varying the pressure of the same against one another and against the central roller and the circular track.

4. A device of the class described including a circular track, a central roller, outer rollers arranged in pairs to run on the circular track, intermediate rollers interposed between the outer rollers and the central roller, curved brake shoe supports carrying the intermediate and outer rollers and fulcrumed at one end, and means operating between the other ends of the brake shoe supports for expanding the same.

5. A device of the class described including a circular track, a central roller, outer rollers arranged in pairs to run on the circular track, intermediate rollers interposed between the outer rollers and the central roller, curved brake shoe supports carrying the intermediate and outer rollers and fulcrumed at one end, and a cam shaft having a slidable self-adjusting cam interposed between the other ends of the brake shoe supports for expanding the same uniformly.

6. A device of the class described including a circular track, a central roller, outer rollers arranged in pairs to run on the circular track, intermediate rollers interposed between the outer rollers and the central roller, curved brake shoe supports carrying the intermediate and outer rollers and fulcrumed at one end, a cam shaft having a slot, and a cam slidable in the slot of the cam shaft and projecting from opposite sides and engaging the other ends of the brake shoe supports for expanding the same uniformly.

7. A device of the class described including a circular track, a central roller concentric with the track, a pair of outer rollers arranged to run on the track, an intermediate roller interposed between the outer rollers and the central roller, and brake shoe supports carrying the outer rollers and the intermediate roller and provided with angularly related means for causing an inward movement of the outer rollers toward each other when the brake shoe supports is extended.

8. A device of the class described including a circular track, a central roller, a pair of outer rollers arranged to run on the track, an intermediate roller arranged between the outer rollers and the central roller, and brake shoe supports having divergent slots receiving and guiding the outer rollers, whereby the said outer rollers are forced inwardly toward each other when the brake shoe support is expanded.

9. A device of the class described including a central roller, a circular track concentric with the central roller, approximately semi-circular brake shoe supports fulcrumed at one end and provided intermediate of their ends with outwardly diverging slots, outer rollers arranged to run on the track and having shafts operating in the slots of the brake shoe supports, intermediate rollers interposed between the outer rollers and the central roller, and means for expanding the brake shoe supports.

10. A device of the class described including a central roller, a circular track concentric with the central roller, approximately semi-circular brake shoe supports fulcrumed at one end and provided intermediate of their ends with outwardly diverging slots, outer rollers arranged to run on the track and having shafts operating in the slots of the brake shoe supports, intermediate rollers interposed between the outer rollers and the central roller and provided with shafts, links pivoted to the brake shoe supports and having slots receiving the shafts of the intermediate rollers, and means for expanding the brake shoe supports.

11. A device of the class described including a central roller, a circular track concentric with the central roller, approximately semi-circular brake shoe supports fulcrumed at one end and provided intermediate of their ends with outwardly diverging slots, outer rollers arranged to run on the track and having shafts operating in the slots of the brake shoe supports, intermediate rollers interposed between the outer rollers and the central roller and provided with shafts, links pivoted to the brake shoe supports and having slots receiving the shafts of the intermediate rollers, the shafts of the intermediate and outer rollers having flattened end portions and the said slots of the brake shoe supports and the links having straight side walls forming guides for the flattened portions of the shafts, and means for expanding the brake shoe supports.

12. A device of the class described including a central roller, a circular track concentric with the central roller, approximately semi-circular brake shoe supports fulcrumed at one end and provided intermediate of their ends with outwardly diverging slots, outer rollers arranged to run on the track and having shafts operating in the slots of the brake shoe supports, intermediate rollers interposed between the outer rollers and the central roller and provided with shafts, links pivoted to the brake shoe supports and having slots receiving the shafts of the intermediate rollers, the shafts of the intermediate and outer rollers having flattened end portions and the said slots of the brake shoe supports and the links having straight side walls forming guides for the flattened portions of the shafts, yieldable means connected with the shoe support and with the shafts of the intermediate rollers, other yieldable means connecting the brake shoes, and means for expanding the brake shoe supports.

13. A device of the class described including a brake drum provided at intervals on the inner face of its periphery with lugs, a circular track arranged within the brake drum and having peripheral recesses receiving said lugs to interlock the track with the brake drum, a central roller designed to be mounted on the central shaft and arranged concentric with the track, outer rollers arranged in pairs to run on the said track, intermediate rollers interposed between the outer rollers and the central roller, and brake shoe supports carrying the outer rollers and the intermediate rollers and adapted to be expanded to vary the pressure of the rollers against one another and against the track.

14. A device of the class described including a circular track, a central roller, outer rollers arranged to run on the said track, intermediate rollers interposed between the outer rollers and the central roller, and brake shoe supports fulcrumed at one end and composed of spaced sides receiving between them the outer and intermediate rollers, said brake shoe supports having means for guiding the said intermediate and outer rollers, and means for expanding the brake shoe supports.

In testimony whereof I have hereunto set my hand.

COLIN STUART.